(12) United States Patent
Satomi et al.

(10) Patent No.: US 12,401,032 B2
(45) Date of Patent: Aug. 26, 2025

(54) NICKEL COMPOSITE HYDROXIDE, POSITIVE ELECTRODE ACTIVE MATERIAL USING NICKEL COMPOSITE HYDROXIDE AS PRECURSOR, AND METHODS FOR PRODUCING THE SAME

(71) Applicant: TANAKA CHEMICAL CORPORATION, Fukui (JP)

(72) Inventors: Naotoshi Satomi, Fukui (JP); Yasutaka Iida, Fukui (JP); Mikio Hata, Fukui (JP)

(73) Assignee: TANAKA CHEMICAL CORPORATION, Fukui (JP)

( * ) Notice: Subject to any disclaimer, the term of this patent is extended or adjusted under 35 U.S.C. 154(b) by 614 days.

(21) Appl. No.: 17/580,746

(22) Filed: Jan. 21, 2022

(65) Prior Publication Data
US 2022/0140339 A1    May 5, 2022

Related U.S. Application Data

(63) Continuation of application No. PCT/JP2020/030129, filed on Aug. 6, 2020.

(51) Int. Cl.
*H01M 4/525* (2010.01)
*H01M 4/04* (2006.01)
(Continued)

(52) U.S. Cl.
CPC ......... *H01M 4/525* (2013.01); *H01M 4/0416* (2013.01); *H01M 4/505* (2013.01); *H01M 2004/021* (2013.01); *H01M 2004/028* (2013.01)

(58) Field of Classification Search
CPC .................. C01G 45/02; C01G 55/00
See application file for complete search history.

(56) References Cited

U.S. PATENT DOCUMENTS

| 9,941,515 B2 * | 4/2018 | Kamata | H01M 4/505 |
| 10,305,105 B2 * | 5/2019 | Saruwatari | H01M 4/525 |

(Continued)

FOREIGN PATENT DOCUMENTS

| CN | 103764568 A | 4/2014 |
| CN | 104953111 A * | 9/2015 |

(Continued)

OTHER PUBLICATIONS

International Search Report dated Oct. 27, 2020 from International Patent Application No. PCT/JP2020/030129, 5 pages.
(Continued)

*Primary Examiner* — Amanda C. Walke
(74) *Attorney, Agent, or Firm* — Ohlandt, Greeley and Perle, L.L.P.

(57) ABSTRACT

Provided is a nickel composite hydroxide capable of reducing a calcination temperature when producing a positive electrode active material, and a positive electrode active material using the nickel composite hydroxide as a precursor. The nickel composite hydroxide for a precursor of a positive electrode active material of a non-aqueous electrolyte secondary battery, wherein when in the nickel composite hydroxide, a peak intensity of a diffraction peak on a (200) plane in powder X-ray diffraction measurement using CuK$\alpha$ rays is defined as $\alpha$, and a peak intensity of a diffraction peak on a (013) plane in powder X-ray diffraction measurement using CuK$\alpha$ rays is defined as $\beta$, a value of $\alpha/\beta$ is 0.75 or more and 0.95 or less, and the nickel composite hydroxide comprises Ni, Co, Mn, and one or more additive elements M selected from the group consisting of Al, Fe, Ti and Zr.

16 Claims, 2 Drawing Sheets

(51) Int. Cl.
  *H01M 4/505*    (2010.01)
  *H01M 4/02*     (2006.01)

(56) References Cited

U.S. PATENT DOCUMENTS

| | | | |
|---|---|---|---|
| 11,365,130 B2* | 6/2022 | Imanari | C01G 53/00 |
| 2014/0225031 A1 | 8/2014 | Yasuda et al. | |
| 2016/0164093 A1* | 6/2016 | Inoue | H01M 4/505 |
| | | | 429/223 |
| 2018/0040882 A1 | 2/2018 | Kim et al. | |
| 2019/0270650 A1 | 9/2019 | Imanari et al. | |
| 2021/0135201 A1* | 5/2021 | Hozumi | H01M 10/30 |
| 2022/0144664 A1* | 5/2022 | Satomi | H01M 4/505 |

FOREIGN PATENT DOCUMENTS

| | | | | |
|---|---|---|---|---|
| CN | 105474439 A | | 4/2016 | |
| CN | 106558695 A | * | 4/2017 | ........ H01M 10/0525 |
| CN | 109803928 A | * | 5/2019 | ............ C01G 53/00 |
| CN | 109923709 A | | 6/2019 | |
| CN | 109962237 A | | 7/2019 | |
| EP | 3279144 A1 | | 2/2018 | |
| JP | 2005023030 A | * | 1/2005 | |
| JP | 2012256435 A | * | 12/2012 | |
| JP | 2013-75773 A | | 4/2013 | |
| JP | 2014-139119 A | | 7/2014 | |
| JP | 2015-56368 A | | 3/2015 | |
| JP | 2015227263 A | * | 12/2015 | |
| JP | 2019131417 A | * | 8/2019 | ............. G05F 1/569 |
| WO | WO-2012169274 A1 | * | 12/2012 | ............ C01G 53/006 |
| WO | WO-2017033895 A1 | * | 3/2017 | ............ C01G 53/006 |
| WO | WO-2018021557 A1 | * | 2/2018 | ............ C01G 53/006 |

OTHER PUBLICATIONS

Written Opinion dated Oct. 27, 2020 from International Patent Application No. PCT/JP2020/030129, 5 pages.
International Search Report dated Oct. 27, 2020 from International Patent Application No. PCT/JP2020/030128, 5 bages.
Written Opinion dated Oct. 27, 2020 from International Patent Application No. PCT/JP2020/030128, 4 pages.
Notice of Reasons for Refusal dated Jul. 4, 2023 in the corresponding Japanese Application No. 2019145619.
Decision of Rejection dated Jul. 21, 2023 in the corresponding Chinese Application No. 202080056069.X.
First Office Action dated Feb. 9, 2023 in the corresponding CN application No. 202080056069.X.
First Office Action dated Feb. 10, 2023 in the corresponding CN application No. 202080056070.2.
Wang Weidomg et al., "Nickel Cobalt Manganese Based Cathode Materials for Li-ion Batteries Technology Production and Application", Chemical Industry Press, May 2015; pp. 1-6.
Second Office Action dated Aug. 3, 2023 in the corresponding Chinese Application No. 202080056070.2.
Extended European Search Report dated Aug. 7, 2023 in the corresponding EP application No. 20850136.1.
Extended European Search Report dated Aug. 7, 2023 in the corresponding EP application No. 20849719.8.
Peiyu Hou et al., "High"rate and long" life lithium ion batteries coupling surface "Al3+" enriched LiNi0.7Co0.15Mn0.15O2 cathode with porous Li4Ti5O12 anode", Chemical Engineering Journal, Elseiver, Amsterdam, NL, vol. 378, Jun. 29, 2019.
Yong"Chun Li et al., "Construction of homogeneously AL3+ doped Ni rich Ni" Co Mn cathode with high stable cycling perfomance and storage stability via scalable continuous precipitation", Electrochimica Acta , Elsevier, Amsterdam, NL, vol. 291, Sep. 21, 2018, pp. 84-pp. 94.
Written Opinion (English translation) dated Oct. 27, 2020 from International Patent Application No. PCT/JP2020/030128, 4 pages.
Written Opinion (English translation) dated Oct. 27, 2020 from International Patent Application No. PCT/JP2020/030129, 5 pages.
International Report on Patentability (IPRP—(English translation) dated Feb. 8, 2022 from International Patent Application No. PCT/JP2020/030128, 5 pages.
International Report on Patentability (IPRP—(English translation) dated Feb. 8, 2022 from International Patent Application No. PCT/JP2020/030129, 6 pages.
Japanese Office action dated Oct. 2, 2024 in the corresponding Japanese Application No. 2021-537367.
Japanese Office Action (with English translation) dated Feb. 6, 2025 for Japanese Application No. 2021-537367.
Japanese Office Action (with English translation) dated Jul. 8, 2025 for Japanese Application No. 2021-537367.

* cited by examiner

NICKEL COMPOSITE HYDROXIDE, POSITIVE ELECTRODE ACTIVE MATERIAL USING NICKEL COMPOSITE HYDROXIDE AS PRECURSOR, AND METHODS FOR PRODUCING THE SAME

CROSS REFERENCE TO RELATED APPLICATIONS

The present application is a continuation application of International Patent Application No. PCT/JP2020/030129 filed on Aug. 6, 2020, which claims the benefit of Japanese Patent Application No. 2019-145620, filed on Aug. 7, 2019. The contents of these applications are incorporated herein by reference in their entirety.

BACKGROUND

Technical Field

The present disclosure relates to a nickel composite hydroxide, a positive electrode active material using a nickel composite hydroxide as a precursor, and a method for producing the same, and particularly relates to a nickel composite hydroxide capable of reducing a calcination temperature when producing a positive electrode active material, and a method for producing the same.

Background Art

In recent years, from the viewpoint of reducing the environmental load, secondary batteries have been used in a wide range of fields such as mobile devices and vehicles that use electricity or combine it for use as a power source. Examples of the secondary batteries include a secondary battery using a non-aqueous electrolyte such as a lithium ion secondary battery. The secondary battery using a non-aqueous electrolyte such as the lithium ion secondary battery is suitable for miniaturization and weight reduction, and has characteristics such as a high utilization ratio and high cycle characteristics.

Meanwhile, in producing a positive electrode active material by calcining a nickel composite hydroxide that is a precursor, from the viewpoints of further improvement of various characteristics such as the high utilization ratio and high cycle characteristics, improvement of production efficiency, energy saving, etc., it has been required to reduce the temperature upon calcination as low as possible. In particular, the nickel composite hydroxide is not excellent in reactivity with a lithium compound, and when producing a lithium-nickel composite oxide that is used as a positive electrode active material for lithium ion secondary batteries by calcining a mixture of the nickel composite hydroxide and the lithium compound, a high calcination temperature is required to produce it.

Therefore, in order to reduce the aforementioned calcination temperature, Japanese Patent Application Laid-Open No. 2014-139119 proposes a nickel-cobalt-manganese-based composite oxide having an intensity of a XRD peak at $2\theta=18.3\pm0.5°$ and an intensity of a XRD peak at $2\theta=37.1\pm1.5°$ in a XRD pattern in XRD measurement using CuKα rays as a radiation source, which are equivalent with each other, or the peak intensity of 18.3° being not greater than the peak intensity of 37.1°. In Japanese Patent Application Laid-Open No. 2014-139119, by imparting the characteristic crystal structure having the aforementioned peak intensity to the nickel-cobalt-manganese-based composite oxide, the calcination temperature is reduced.

However, in the precursor of Japanese Patent Application Laid-Open No. 2014-139119, the preferred calcination temperature is still in the range of 800° C. to 1000° C., which is not significantly different from the conventional calcination temperature, and thus there is room for improvement in reducing the calcination temperature.

SUMMARY

In view of the above circumstances, an object of the present disclosure is to provide a nickel composite hydroxide capable of reducing a calcination temperature when producing a positive electrode active material, a positive electrode active material using the nickel composite hydroxide as a precursor, and a method for producing the same.

The gist of configuration of the present disclosure is as follows:

[1] A nickel composite hydroxide for a precursor of a positive electrode active material of a non-aqueous electrolyte secondary battery, wherein when in the nickel composite hydroxide, a peak intensity of a diffraction peak on a (200) plane in powder X-ray diffraction measurement using CuKα rays is defined as α, and a peak intensity of a diffraction peak on a (013) plane in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti and Zr.

[2] The nickel composite hydroxide according to [1], wherein in the nickel composite hydroxide, the diffraction peak of the (200) plane is a diffraction peak appearing in a range of $2\theta=69.2\pm0.1°$, and the diffraction peak of the (013) plane is a diffraction peak appearing in a range of $2\theta=70.4\pm0.1°$, and when a peak intensity of the diffraction peak appearing in the range of $2\theta=69.2\pm0.1°$ in powder X-ray diffraction measurement using CuKα rays is defined as α, and a peak intensity of the diffraction peak appearing in the range of $2\theta=70.4\pm0.1°$ in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti, and Zr.

[3] The nickel composite hydroxide according to [1], wherein in the nickel composite hydroxide, the diffraction peak of the (200) plane is a diffraction peak appearing in a range of $2\theta=69.5\pm0.3°$, and the diffraction peak of the (013) plane is a diffraction peak appearing in a range of $2\theta=70.5\pm0.3°$, and when a peak intensity of the diffraction peak appearing in the range of $2\theta=69.5\pm0.3°$ in powder X-ray diffraction measurement using CuKα rays is defined as α, and a peak intensity of the diffraction peak appearing in the range of $2\theta=70.5\pm0.3°$ in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti, and Zr.

[4] The nickel composite hydroxide according to any one of [1] to [3], wherein a molar ratio of Ni:Co:Mn:M, of the nickel composite hydroxide is represented by 1−x−y−z:x:y:z, where $0<x\leq0.15$, $0<y\leq0.15$, $0\leq z\leq0.05$, and M represents one or more additive elements selected from the group consisting of Al, Fe, Ti and Zr.

[5] The nickel composite hydroxide according to any one of [1] to [4], wherein a secondary particle diameter having a cumulative volume percentage of 50% by volume (D50) is 6.0 μm or more and 16.0 μm or less.

[6] The nickel composite hydroxide according to any one of [1] to [5], wherein a value of [a secondary particle diameter having a cumulative volume percentage of 90% by volume (D90)–a secondary particle diameter having a cumulative volume percentage of 10% by volume (D10)]/a secondary particle diameter having a cumulative volume percentage of 50% by volume (D50), is 0.80 or more and 1.2 or less.

[7] A positive electrode active material of a non-aqueous electrolyte secondary battery, wherein the nickel composite hydroxide according to any one of [1] to [6] is calcined with a lithium compound.

[8] A method for producing a nickel composite hydroxide, comprising:
- a crystallization step of mixing an aqueous solution containing a nickel salt, a cobalt salt, and a manganese salt with a pH adjuster in a reaction vessel and performing coprecipitation reaction in the mixed liquid to obtain a crude nickel composite hydroxide; and
- a solid-liquid separation step of washing the crude nickel composite hydroxide obtained in the crystallization step with an alkaline aqueous solution and then subjecting the resultant to solid-liquid separation,
- wherein an ammonia concentration of the mixed liquid in the crystallization step is 0.0 g/L or more and 3.5 g/L or less, and a pH of the mixed liquid based on a liquid temperature of 40° C. is 10.4 or more and 11.5 or less.

[9] The method for producing a nickel composite hydroxide according to [8], wherein the aqueous solution containing a nickel salt, a cobalt salt, and a manganese salt is mixed with an ammonium ion donor and the pH adjuster in the reaction vessel.

[10] A method for producing a positive electrode active material of a non-aqueous electrolyte secondary battery, comprising: a crystallization step of mixing an aqueous solution containing a nickel salt, a cobalt salt, and a manganese salt with a pH adjuster in a reaction vessel and performing coprecipitation reaction in the mixed liquid to obtain a crude nickel composite hydroxide; and
- a solid-liquid separation step of washing the crude nickel composite hydroxide obtained in the crystallization step with an alkaline aqueous solution and then subjecting the resultant to solid-liquid separation, the method comprising:
- a step of controlling an ammonia concentration of the mixed liquid in the crystallization step to 0.0 g/L or more and 3.5 g/L or less and controlling a pH of the mixed liquid based on a liquid temperature of 40° C. to 10.4 or more and 11.5 or less to obtain a nickel composite hydroxide; a step of adding a lithium compound to the obtained nickel composite hydroxide to obtain a mixture of the lithium compound and the nickel composite hydroxide; and
- a step of calcining the mixture at a calcination temperature of 500° C. or higher and 650° C. or lower.

[11] The method for producing a positive electrode active material of a non-aqueous electrolyte secondary battery according to [10], wherein the aqueous solution containing a nickel salt, a cobalt salt, and a manganese salt is mixed with an ammonium ion donor and the pH adjuster in the reaction vessel.

As used herein, the "(200) plane in powder X-ray diffraction measurement" and the "(013) plane in powder X-ray diffraction measurement" refer to the planes each obtained by subjecting a nickel composite hydroxide powder to measurement by using a CuKα radiation source (40 kV/40 mA) under the conditions of a diffraction angle of 2θ=5° to 80°, a sampling width of 0.03°, and a scan speed of 20°/min, to obtain a powder X-ray diffraction pattern, subjecting the resultant to smoothing processing and background removal processing by using an integrated powder X-ray analysis software PDXL, and selecting "Theophrastite, syn Ni(OH)$_2$" to identify the planes.

According to an aspect of the nickel composite hydroxide of the present disclosure, when a peak intensity of a diffraction peak on a (200) plane in powder X-ray diffraction measurement using CuKα rays is defined as α, and a peak intensity of a diffraction peak on a (013) plane in powder X-ray diffraction measurement using CuKα rays is defined as β, a value of α/β being 0.75 or more and 0.95 or less can reduce the calcination temperature when producing a positive electrode active material from the nickel composite hydroxide that is a precursor.

Moreover, according to an aspect of the nickel composite hydroxide of the present disclosure, when a peak intensity of a diffraction peak appearing in a range of 2θ=69.2±0.1° in powder X-ray diffraction measurement using CuKα rays is defined as α, and a peak intensity of a diffraction peak appearing in a range of 2θ=70.4±0.1° in powder X-ray diffraction measurement using CuKα rays is defined as β, a value of α/β being 0.75 or more and 0.95 or less, can reduce the calcination temperature when producing the positive electrode active material from the nickel composite hydroxide that is the precursor. Further, according to an aspect of the nickel composite hydroxide of the present disclosure, when a peak intensity of a diffraction peak appearing in a range of 2θ=69.5±0.3° in powder X-ray diffraction measurement using CuKα rays is defined as α, and a peak intensity of a diffraction peak appearing in a range of 2θ=70.5±0.3° in powder X-ray diffraction measurement using CuKα rays is defined as β, a value of α/β being 0.75 or more and 0.95 or less can reduce a calcination temperature when producing the positive electrode active material from the nickel composite hydroxide that is the precursor.

According to an aspect of the nickel composite hydroxide of the present disclosure, a secondary particle diameter having a cumulative volume percentage of 50% by volume (D50) being 6.0 μm or more and 16.0 μm or less enables the contactability with a non-aqueous electrolyte to be improved while improving a mounting density of the positive electrode active material.

According to an aspect of the nickel composite hydroxide of the present disclosure, a value of [a secondary particle diameter having a cumulative volume percentage of 90% by volume (D90)–a secondary particle diameter having a cumulative volume percentage of 10% by volume (D10)]/ the secondary particle diameter having a cumulative volume percentage of 50% by volume (D50) being 0.80 or more and 1.2 or less, can uniformize various characteristics of the positive electrode active material regardless of a particle diameter of the nickel composite hydroxide, while improving the mounting density of the positive electrode active material.

According to an aspect of a method for producing the nickel composite hydroxide of the present disclosure, an ammonia concentration of a mixed liquid in a crystallization step being 0.0 g/L or more and 3.5 g/L or less, and a pH based on a liquid temperature of 40° C. of 10.4 or more and 11.5 or less, enable a nickel composite hydroxide capable of reducing a calcination temperature to be obtained when producing the positive electrode active material.

DETAILED DESCRIPTION

Hereinafter, the nickel composite hydroxide that is the precursor of the positive electrode active material of a non-aqueous electrolyte secondary battery of the present disclosure will be described in detail below. The nickel composite hydroxide that is the precursor of the positive electrode active material of the non-aqueous electrolyte secondary battery of the present disclosure (hereinafter, may be simply referred to as the "nickel composite hydroxide of the present disclosure") comprises nickel (Ni), cobalt (Co), and manganese (Mn). Namely, the nickel composite hydroxide of the present disclosure comprises Ni, Co and Mn as essential metal components.

The nickel composite hydroxide of the present disclosure is a secondary particle formed by aggregation of a plurality of primary particles. A particle shape of the nickel composite hydroxide of the present disclosure is not particularly limited and has a wide variety of shapes, and examples thereof can include a substantially spherical shape and a substantially elliptical shape.

The nickel composite hydroxide of the present disclosure is configured to comprise a structure belonging to a hexagonal space group P-3m1 in powder X-ray diffraction measurement using CuKα rays, and when the range of 2θ=69.2±0.1°, as a result of identifying it by selecting "Theophrastite, syn Ni(OH)$_2$", can be expressed as a (200) plane and has a diffraction peak whose peak intensity is defined as α, and the range of 2θ=70.4±0.1° in powder X-ray diffraction measurement using CuKα rays, as a result of identifying it by selecting "Theophrastite, syn Ni(OH)$_2$", can be expressed as a (013) plane and has a diffraction peak whose peak intensity is defined as β, the value of α/β that is a ratio of the peak intensity α to the peak intensity β, is 0.75 or more and 0.95 or less. When the value of α/β is 0.75 or more and 0.95 or less, it is possible to reduce the calcination temperature when producing the positive electrode active material from the nickel composite hydroxide of the present disclosure that is the precursor. Therefore, by using the nickel composite hydroxide of the present disclosure as the precursor of the positive electrode active material, it is possible to obtain a positive electrode active material having further improved various characteristics such as the high utilization ratio and high cycle characteristics, and producing the positive electrode active material from the nickel composite hydroxide of the present disclosure, enables production efficiency to be improved and energy to be saved.

Moreover, the nickel composite hydroxide of the present disclosure is configured to comprise the structure belonging to the hexagonal space group P-3m1 in powder X-ray diffraction measurement using CuKα rays, and when the range of 2θ=69.5±0.3°, as a result of identifying it by selecting "Theophrastite, syn Ni(OH)$_2$", can be expressed as the (200) plane and has a diffraction peak whose peak intensity is defined as α, and the range of 2θ=70.5±0.3° in powder X-ray diffraction measurement using CuKα rays, as a result of identifying it by selecting "Theophrastite, syn Ni(OH)$_2$", can be expressed as the (013) plane and has a diffraction peak whose peak intensity is defined as β, the value of α/β that is a ratio of the peak intensity α to the peak intensity β, is 0.75 or more and 0.95 or less. When the value of α/β is 0.75 or more and 0.95 or less, it is possible to reduce the calcination temperature when producing the positive electrode active material from the nickel composite hydroxide of the present disclosure that is the precursor. Therefore, by using the nickel composite hydroxide of the present disclosure as the precursor of the positive electrode active material, it is possible to obtain a positive electrode active material having further improved various characteristics such as the high utilization ratio and high cycle characteristics, and producing the positive electrode active material from the nickel composite hydroxide of the present disclosure, enables production efficiency to be improved and energy to be saved.

The peak of peak intensity α is considered to derive from a crystal structure of nickel hydroxide, and the peak of peak intensity β is considered to derive from the crystal structure of nickel hydroxide.

The value of α/β is not particularly limited as long as it is 0.75 or more and 0.95 or less, however the lower limit value thereof is more preferably 0.78 and particularly preferably 0.80, from the viewpoint of further reducing the calcination temperature when producing the positive electrode active material. The upper limit value of α/β is, on the other hand, more preferably 0.93 and particularly preferably 0.91 from the viewpoint of further reducing the calcination temperature when producing the positive electrode active material. The above upper limit values and lower limit values can be arbitrarily combined.

The nickel composite hydroxide of the present disclosure having a composition represented by, for example, a molar ratio of Ni:Co:Mn:M being 1−x−y−z:x:y:z, where 0<x≤0.15, 0<y≤0.15, 0≤z≤0.05, and M represents one or more additive elements selected from the group consisting of Al, Fe, Ti and Zr, can be included.

A particle diameter of the nickel composite hydroxide of the present disclosure is not particularly limited, but for example, the lower limit value of a secondary particle diameter having a cumulative volume percentage of 50% by volume (hereinafter, may be simply referred to as "D50"), is preferably 5.5 μm and particularly preferably 6.0 μm, from the viewpoint of improving the mounting density of the positive electrode active material on the positive electrode. On the other hand, the upper limit value of D50 of the nickel composite hydroxide of the present disclosure is preferably 16.5 μm and particularly preferably 16.0 μm, from the viewpoint of improving the contactability with the electrolyte. The above upper limit values and lower limit values can be arbitrarily combined. Further, the lower limit value of the secondary particle diameter of the nickel composite hydroxide of the present disclosure having a cumulative volume percentage of 90% by volume (hereinafter, may be simply referred to as "D90"), is preferably 15.0 μm and particularly preferably 17.0 μm, from the viewpoint of improving the mounting density of the positive electrode active material on the positive electrode. On the other hand, the upper limit value of D90 of the nickel composite hydroxide of the present disclosure is preferably 27.0 µm and particularly preferably 25.0 µm, from the viewpoint of improving the contactability with the non-aqueous electrolyte. The above upper limit values and lower limit values can be arbitrarily combined. Further, the lower limit value of the secondary particle diameter of the nickel composite hydroxide of the present disclosure having a cumulative volume percentage of 10% by volume (hereinafter, may be simply referred to as "D10") is preferably 4.5 µm and particularly preferably 5.5 µm, from the viewpoint of improving the mounting density of the positive electrode active material on the positive electrode. On the other hand, the upper limit value of D10 of the nickel composite hydroxide of the present disclosure is preferably 8.5 µm and particularly preferably 7.5 µm, from the viewpoint of improving the contactability with the non-aqueous electrolyte. The above upper limit values and lower limit values can be arbitrarily combined. It is noted that D10, D50, and D90 refer to particle diameters measured by a particle size distribution measuring apparatus by using a laser diffraction/scattering method.

Moreover, a particle diameter distribution width of the nickel composite hydroxide of the present disclosure is not particularly limited, but a lower limit value of (D90−D10)/D50 is preferably 0.65 and particularly preferably 0.80 from the viewpoint of improving the mounting density of the positive electrode active material on the positive electrode. On the other hand, an upper limit value of (D90−D10)/D50 of the nickel composite hydroxide of the present disclosure is preferably 1.60 and particularly preferably 1.20, from the viewpoint of uniformizing various characteristics of the positive electrode active material regardless of the particle diameter of the nickel composite hydroxide. The above upper limit values and lower limit values can be arbitrarily combined.

A tap density (TD) of the nickel composite hydroxide of the present disclosure is not particularly limited, but for example, the lower limit value thereof is preferably 1.40 g/ml and particularly preferably 1.50 g/ml from the viewpoint of improving a filling degree of the positive electrode active material in the positive electrode. On the other hand, the upper limit value of the tap density of the nickel composite hydroxide of the present disclosure is preferably 2.40 g/ml and particularly preferably 2.30 g/ml, for example, from the viewpoint of improving the contactability between the positive electrode active material and the non-aqueous electrolyte. It is noted that the above upper limit values and lower limit values can be arbitrarily combined.

A bulk density (BD) of the nickel composite hydroxide of the present disclosure is not particularly limited, but for example, the lower limit value thereof is preferably 1.00 g/ml and particularly preferably 1.10 g/ml from the viewpoint of improving the filling degree of the positive electrode active material in the positive electrode. On the other hand, the upper limit value of the bulk density of the nickel composite hydroxide of the present disclosure is preferably 1.80 g/ml and particularly preferably 1.75 g/ml, for example, from the viewpoint of improving the contactability between the positive electrode active material and the non-aqueous electrolyte. The above upper limit values and lower limit values can be arbitrarily combined.

A BET specific surface area of the nickel composite hydroxide of the present disclosure is not particularly limited, but for example, the lower limit value thereof is preferably 5.0 m$^2$/g and particularly preferably 6.0 m$^2$/g from the viewpoint of improving the filling degree of the positive electrode active material in the positive electrode and a contact area with the non-aqueous electrolyte. On the other hand, the upper limit value of the BET specific surface area of the nickel composite hydroxide of the present disclosure is preferably 40 m$^2$/g and particularly preferably 30 m$^2$/g from the viewpoint of improving a crush strength of the positive electrode active material. It is noted that the above upper limit values and lower limit values can be arbitrarily combined.

Next, the method for producing the nickel composite hydroxide of the present disclosure will be described. First, a solution containing a nickel salt (for example, a sulfate), a cobalt salt (for example, a sulfate) and a manganese salt (for example, a sulfate), and optionally a complexing agent and a pH adjuster are appropriately added, and then the mixture is neutralized and crystallized in the reaction vessel by a coprecipitation method to prepare a crude nickel composite hydroxide, and to obtain a slurry suspension containing the crude nickel composite hydroxide. A solvent of the suspension that is, for example, water is used. Moreover, an aspect of the crude nickel composite hydroxide includes a particulate state thereof.

The complexing agent is not particularly limited as long as it can form a complex with a nickel ion, a cobalt ion, and a manganese ion in an aqueous solution, and includes, for example, an ammonium ion donor. The ammonium ion donor includes, for example, ammonium sulfate, ammonium chloride, ammonium carbonate, and ammonium fluoride. In the neutralization reaction, an alkali metal hydroxide (for example, sodium hydroxide or potassium hydroxide) is appropriately added as a pH adjuster in order to adjust a pH value of the aqueous solution.

To a metal salt solution containing the aforementioned nickel, cobalt, and manganese, the pH adjuster and optionally the ammonium ion donor are appropriately supplied to a reaction vessel in a continuous manner, and a mixed liquid in the reaction vessel is appropriately stirred to coprecipitate the metals in the metal salt solution (nickel, cobalt, manganese) by the neutralization reaction, and to crystallize the crude nickel composite hydroxide. In the neutralization reaction, a temperature of the reaction vessel is controlled in the range of, for example, 10° C. to 90° C. and preferably 20° C. to 80° C. When the pH adjuster and optionally the ammonium ion donor are supplied to the reaction vessel for the neutralization reaction, an ammonia concentration of the mixed liquid in the reaction vessel is controlled to 0.0 g/L or more and 3.5 g/L or less and preferably 1.8 g/L or more and 3.0 g/L or less, and by controlling a pH of the mixed liquid based on the liquid temperature of 40° C. is 10.8 or more and 11.5 or less, and preferably 11.0 or more and 11.2 or less, a nickel composite hydroxide having the above α/β value of 0.75 or more and 0.95 or less can be produced.

The reaction vessel used in the method for producing the nickel composite hydroxide of the present disclosure can include, for example, a continuous type that overflows the obtained crude nickel composite hydroxide to separate it, and a batch type that does not discharge it to an outside of the system until a reaction is completed.

As described above, the crude nickel composite hydroxide obtained in the crystallization step is filtered from the suspension and then washed with an alkaline aqueous solution to remove impurities included in the crude nickel composite hydroxide, and to enable a purified nickel composite hydroxide (the nickel composite hydroxide of the present disclosure) to be obtained. Then, it is subjected to solid-liquid separation, the solid phase containing the nickel composite hydroxide is optionally washed with water, and the nickel composite hydroxide is heat-treated and dried to enable a powdery nickel composite hydroxide to be obtained.

Next, the positive electrode active material of a non-aqueous electrolyte secondary battery using the nickel composite hydroxide of the present disclosure as the precursor (hereinafter, may be simply referred to as the "positive electrode active material of the present disclosure") will be described. The positive electrode active material of the present disclosure is an aspect such that the nickel composite hydroxide of the present disclosure that is the precursor, has been calcined with, for example, a lithium compound. A crystal structure of the positive electrode active material of the present disclosure is a layered structure, and is more preferably a trigonal crystal structure, a hexagonal crystal structure, or a monoclinic crystal structure in order to obtain a secondary battery having a high discharge capacity. The positive electrode active material of the present disclosure can be used, for example, as the positive electrode active material of a non-aqueous electrolyte secondary battery such as a lithium ion secondary battery.

It is noted that when producing the positive electrode active material of the present disclosure, a step of preliminarily preparing the nickel composite oxide may be carried out, and the nickel composite oxide may be used as the precursor. The method for preparing the nickel composite oxide from the nickel composite hydroxide can include an oxidation treatment of calcining the nickel composite hydroxide at a temperature of 300° C. or higher and 800° C. or lower for 1 hour or longer and 10 hours or shorter in an atmosphere where an oxygen gas is present.

Next, the method for producing the positive electrode active material of the present disclosure will be described. For example, the method for producing the positive electrode active material of the present disclosure is a method for first adding a lithium compound to the nickel composite hydroxide or the nickel composite oxide to prepare a mixture of the nickel composite hydroxide or the nickel composite oxide, and the lithium compound. The lithium compound is not particularly limited as long as it is a compound having lithium, and can include, for example, lithium carbonate and lithium hydroxide.

Next, the positive electrode active material can be produced by calcining the obtained mixture. The nickel composite hydroxide of the present disclosure can reduce the calcination temperature when producing the positive electrode active material. The conventional calcination temperature is about 800° C. or higher and 1000° C. or lower. However, in the nickel composite hydroxide of the present disclosure, the precursor and the lithium compound sufficiently react with each other even at a calcination temperature of 500° C. or higher and 650° C. or lower, which enables a positive electrode active material having excellent various characteristics such as the high utilization ratio and high cycle characteristics to be produced.

The rate of temperature rise when calcining the obtained mixture is, for example, 50° C./h or more and 300° C./h or less, and a calcination time is 5 hours or longer and 20 hours or shorter. The calcination atmosphere is not particularly limited, and includes, for example, the atmosphere and oxygen. Moreover, a calcination furnace used for calcination is not particularly limited and includes, for example, a stationary box furnace and a roller Hearth continuous furnace.

Next, the positive electrode using the positive electrode active material of the present disclosure will be described.

The positive electrode comprises a positive electrode current collector and a positive electrode active material layer formed on the surface of the positive electrode current collector by using the positive electrode active material of the present disclosure. The positive electrode active material layer has the positive electrode active material of the present disclosure, a binder, and optionally a conductive auxiliary agent. The conductive auxiliary agent is not particularly limited as long as it can be used for a non-aqueous electrolyte secondary battery, and for example, a carbon-based material can be used. The carbon-based material can include graphite powder, carbon black (for example, acetylene black), and a fibrous carbon material. The binder is not particularly limited, and can include, for example, polymer resins such as polyvinylidene difluoride (PVdF), butadiene rubber (BR), polyvinyl alcohol (PVA), carboxymethyl cellulose (CMC), and polytetrafluoroethylene (PTFE), and combinations thereof. The positive electrode current collector is not particularly limited, but for example, a belt-shaped member made of a metal material such as Al, Ni, or stainless steel can be used. A member such that Al is used as a forming material and processed into a thin film, is preferable in terms of facilitation of processing and a low price among them.

The method for producing the positive electrode is, for example, a method for first preparing a positive electrode active material slurry by mixing the positive electrode active material of the present disclosure, the conductive auxiliary agent, and the binder. Next, the positive electrode current collector is coated with the aforementioned positive electrode active material slurry by a known filling method, dried, pressed and fixed to enable a positive electrode to be obtained.

The positive electrode thus obtained as described above by using the positive electrode active material, a negative electrode having a negative electrode current collector and a negative electrode active material layer containing a negative electrode active material, formed on the surface of the negative electrode current collector, an electrolytic solution containing a predetermined electrolyte, and a separator, are mounted by a known method to enable a non-aqueous electrolyte secondary battery to be assembled.

The electrolyte contained in the non-aqueous electrolyte includes $LiClO_4$, $LiPF_6$, $LiAsF_6$, $LiSbF_6$, $LiBF_4$, $LiCF_3SO_3$, $LiN(SO_2CF_3)_2$, $LiN(SO_2C_2F_5)_2$, $LiN(SO_2CF_3)(COCF_3)$, $Li(C_4F_9SO_3)$, $LiC(SO_2CF_3)_3$, $Li_2B_{10}Cl_{10}$, LiBOB where BOB refers to bis(oxalato)borate, LiFSI where FSI refers to bis(fluorosulfonyl) imide, lithium salts such as a lower aliphatic carboxylic acid lithium salt and $LiAlCl_4$. They may be used alone or in combination of two or more.

Moreover, dispersing media for the electrolyte include, for example, carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy) ethane; ethers such as 1,2-dimethoxyethane, 1,3-dimethoxypropane, pentafluoropropylmethyl ether, 2,2,3,3-tetrafluoropropyldifluoromethyl ether, tetrahydrofuran, and 2-methyltetrahydrofuran; esters such as methyl formate, methyl acetate, and γ-butyrolactone; nitriles such as acetonitrile and butyronitrile; amides such as N,N-dimethylformamide, and N,N-dimethylacetamide; carbamates such as 3-methyl-2-oxazolidone; sulfur-containing compounds such as sulfolane, dimethyl sulfoxide, and 1,3-propanesultone, or solvents such that a fluoro group is further introduced into these organic solvents (one or more of hydrogen atoms of the organic solvent are substituted with fluorine atoms), can be used. They may be used alone or in combination of two or more.

Further, a solid electrolyte may be used instead of the electrolytic solution containing the electrolyte. As the solid electrolyte, for example, an organic polymer electrolyte such as a polyethylene oxide-based polymer compound or a polymer compound containing at least one or more of a polyorganosiloxane chain or a polyoxyalkylene chain, can be used. Moreover, a so-called gel type compound in which a non-aqueous electrolytic solution is retained in a polymer compound, can also be used. Further, it includes inorganic solid electrolytes containing sulfides such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$, $Li_2S$—$SiS_2$—$Li_2SO_4$, and $Li_2S$—$GeS_2$—$P_2S_5$. They may be used alone or in combination of two or more.

The separator includes, for example, members in forms such as a porous film, a non-woven fabric, and a woven fabric, having materials such as polyolefin resins such as polyethylene and polypropylene, a fluororesin, and a nitrogen-containing aromatic polymer.

EXAMPLES

Next, examples of the nickel composite hydroxide of the present disclosure will be described, but the present disclosure is not limited to these examples as long as the present disclosure does not deviate from the gist of the present disclosure.

Production of Nickel Composite Hydroxides of Examples and Comparative Example

Production of Nickel Composite Hydroxide of Example 1

An aqueous solution prepared by dissolving nickel sulfate, cobalt sulfate and manganese sulfate in a predetermined molar ratio of nickel:cobalt:manganese, an aqueous solution of ammonium sulfate (ammonium ion donor) and an aqueous solution of sodium hydroxide, were added dropwise to a reaction vessel having a predetermined volume, and continuously stirred by a stirrer equipped with a stirring blade while maintaining a pH of the mixed liquid in the reaction vessel at 11.2 based on a liquid temperature of 40° C. and an ammonia concentration at 2.2 g/L. The inside of the reaction vessel had a nitrogen atmosphere. Moreover, the temperature of the mixed liquid in the reaction vessel was maintained at 70.0° C. The crude nickel composite hydroxide crystallized by the neutralization reaction was allowed to retain in the reaction vessel for 20 hours, then overflowed from an overflow pipe of the reaction vessel and taken out as a suspension. The suspension of the crude nickel composite hydroxide that was taken out was filtered, washed with an alkaline aqueous solution (8% by mass of an aqueous solution of sodium hydroxide), and subjected to solid-liquid separation. Then, the separated solid phase was washed with water, and further subjected to each treatment of dehydration and drying to obtain a powdery purified nickel composite hydroxide.

Production of Nickel Composite Hydroxide of Example 2

A purified nickel composite hydroxide was produced in the same manner as in Example 1 except that an aqueous solution in which the molar ratio of nickel:cobalt:manganese was changed, was used and the pH of the mixed liquid in the reaction vessel was maintained at 11.1 based on the liquid temperature of 40° C.

Production of Nickel Composite Hydroxide of Example 3

A purified nickel composite hydroxide was produced in the same manner as in Example 1 except that an aqueous solution in which the molar ratio of nickel:cobalt:manganese was changed, was used and the pH of the mixed liquid in the reaction vessel was maintained at 11.3 based on the liquid temperature of 40° C.

Production of Nickel Composite Hydroxide of Example 4

A purified nickel composite hydroxide was produced in the same manner as in Example 1 except that the pH of the mixed liquid in the reaction vessel was maintained at 10.2 based on the liquid temperature of 40° C., and the ammonia concentration was maintained at 0.0 g/L without adding the ammonium ion donor as a complexing agent.

Production of Nickel Composite Hydroxide of Example 5

A purified nickel composite hydroxide was produced in the same manner as in Example 1 except that an aqueous solution in which the molar ratio of nickel:cobalt:manganese was changed, was used and the pH of the mixed liquid in the reaction vessel was maintained at 10.2 based on the liquid temperature of 40° C., and the ammonia concentration was maintained at 0.0 g/L without adding the ammonium ion donor as a complexing agent.

Production of Nickel Composite Hydroxide of Comparative Example 1

A purified nickel composite hydroxide was produced in the same manner as in Example 1 except that an aqueous solution in which the molar ratio of nickel:cobalt:manganese was changed, was used and the pH of the mixed liquid in the reaction vessel was maintained at 11.7 based on the liquid temperature of 40° C., and the ammonia concentration was maintained at 3.8 g/L.

Table 1 below shows the neutralization reaction (crystallization) conditions of the nickel composite hydroxides of Examples and Comparative Example.

The evaluation items of the physical properties of the nickel composite hydroxides of Examples and Comparative Example are as follows.

(1) Composition Analysis of Nickel Composite Hydroxide

Composition analysis was carried out by dissolving the obtained nickel composite hydroxide in hydrochloric acid and then using an inductively coupled plasma emission spectrometer (Optima 7300DV, manufactured by PerkinElmer Japan Co., Ltd.).

(2) D10, D50, and D90

The values were measured with a particle size distribution measuring apparatus (MT3300 manufactured by Nikkiso Co., Ltd.) (the principle was a laser diffraction/scattering method). The measurement conditions were as follows: water was used as a solvent, 1 mL of sodium hexametaphosphate was charged as a dispersant, the transmittance after the sample was charged was set to be in the range of 85±3%, and no ultrasonic waves were generated. Moreover, the solvent refractive index of 1.333 that was a refractive index of water, was used when analyzed.

In the obtained cumulative particle diameter distribution curve, a value of the particle diameter at the point where a cumulative volume from the small particle side was 10% is D10 (μm), and a value of the particle diameter at the point where the cumulative volume was 50% was D50 (μm), and a value of the particle diameter at the point where the cumulative volume of 90% was D90 (μm).

Table 1 below shows the evaluation results of the physical properties of the nickel composite hydroxides of Examples and Comparative Example.

TABLE 1

| | Unit | Example 1 | Example 2 | Example 3 | Example 4 | Example 5 | Comparative Example 1 |
|---|---|---|---|---|---|---|---|
| Neutralization temperature | °C. | 70.0 | 70.0 | 70.0 | 70.0 | 70.0 | 70.0 |
| Neutralization pH | — | 11.2 | 11.1 | 11.3 | 10.2 | 10.2 | 11.7 |
| Ammonia concentration | g/L | 2.2 | 2.2 | 2.2 | 0.0 | 0.0 | 3.8 |
| Retention time | hr | 20 | 20 | 20 | 20 | 20 | 20 |
| D10 | μm | 7.0 | 7.4 | 5.6 | 5.9 | 6.3 | 7.5 |
| D50 | μm | 14.4 | 13.6 | 10.2 | 11.7 | 11.5 | 11.2 |
| D90 | μm | 24.1 | 21.4 | 17.3 | 20.8 | 18.1 | 17.4 |
| Ni | mol % | 83.0 | 88.5 | 80.0 | 83.0 | 88.5 | 88.5 |
| Co | mol % | 12.0 | 9.0 | 10.0 | 12.0 | 9.0 | 9.0 |
| Mn | mol % | 5.0 | 2.5 | 10.0 | 5.0 | 2.5 | 2.5 |
| α/β | — | 0.84 | 0.90 | 0.83 | 0.90 | 0.88 | — |

Peak intensity of Diffraction Peaks of Nickel Composite Hydroxides of Examples and Comparative Example In the nickel composite hydroxides of Examples 1 and 2 and Comparative Example 1 each, the peak intensity of the diffraction peak that was configured to comprise the structure of "Theophrastite, syn $Ni(OH)_2$" belonging to the hexagonal space group P-3m1 in powder X-ray diffraction measurement using CuKα rays, appeared in the range of 2θ=69.2±0.1°, and could be denoted as (200), and the peak intensity of the diffraction peak that appeared in the range of 2θ=70.4±0.1° in powder X-ray diffraction measurement using CuKα rays and could be denoted as (013) were measured, respectively. Specifically, the powder X-ray diffraction measurement was carried out by using an X-ray diffractometer (Ultima IV, manufactured by Rigaku Co., Ltd.). Nickel composite hydroxide powder was charged in a dedicated substrate, and the measurement was carried out by using a CuKα radiation source (40 kV/40 mA) under the conditions of a diffraction angle of 2θ=5° to 80°, a sampling width of 0.03°, and a scan speed of 20°/min, to obtain a powder X-ray diffraction pattern. The obtained powder X-ray diffraction pattern was subjected to smoothing processing and background removal processing by using an integrated powder X-ray analysis software PDXL, and was resultingly identified by selecting "Theophrastite, syn $Ni(OH)_2$" to measure the peak intensity α of the diffraction peak appearing in the range of 2θ=69.2±0.1° and the peak intensity β of the diffraction peak appearing in the range of 2θ=70.4±0.1° from the powder X-ray diffraction patterns, and to calculate the peak intensity ratio α/β. Moreover, in the nickel composite hydroxides of Examples 3 to 5 each, the peak intensity of the diffraction peak that was configured to comprise the structure belonging to the hexagonal space group P-3m1 in powder X-ray diffraction measurement using CuKα rays, appeared in the range of 2θ=69.5±0.3°, and could be denoted as (200), and the peak intensity of the diffraction peak that appeared in the range of 2θ=70.5±0.3° in powder X-ray diffraction measurement using CuKα rays and could be denoted as (013), were measured, respectively.

Specific method for measuring peak intensities of diffraction peaks are the same as illustrated in Examples 1 and 2; the peak intensity α of a diffraction peak appearing in the range of 2θ=69.5±0.3° and the peak intensity β of a diffraction peak appearing in the range of 2θ=70.5±0.3° were measured, and the peak intensity ratio α/β was calculated.

Figure 1A:
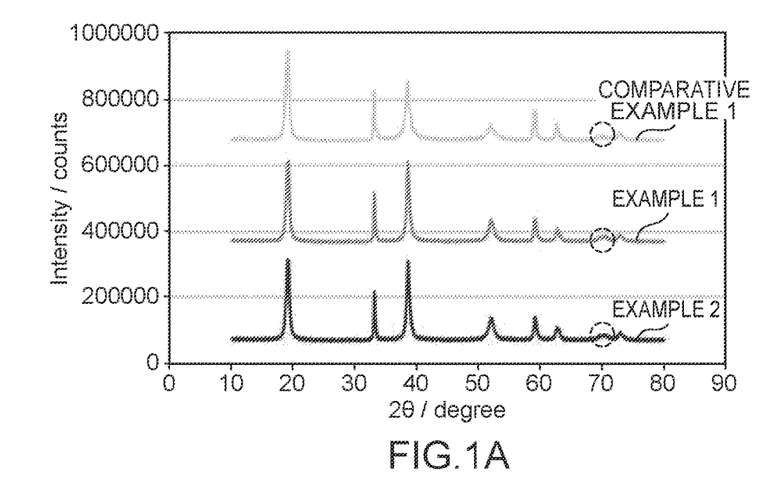
FIG. 1A illustrates powder X-ray diffraction patterns of the nickel composite hydroxides of Examples 1 and 2 and Comparative Example 1.
Figure 1B:
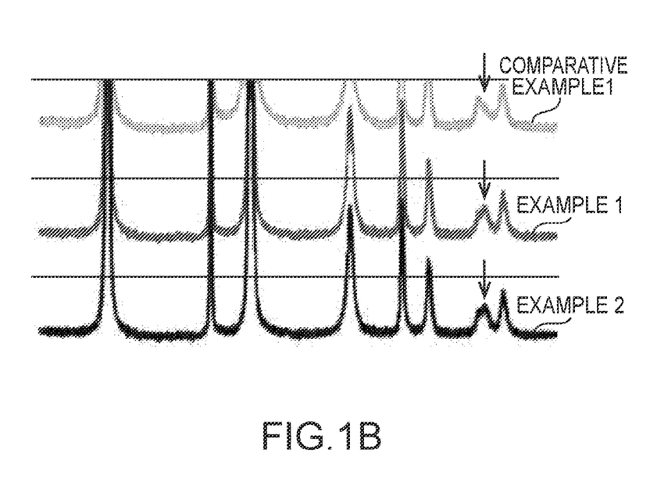
FIG. 1B illustrates enlarged views of powder X-ray diffraction patterns shown in FIG. 1A.
Figure 1C:
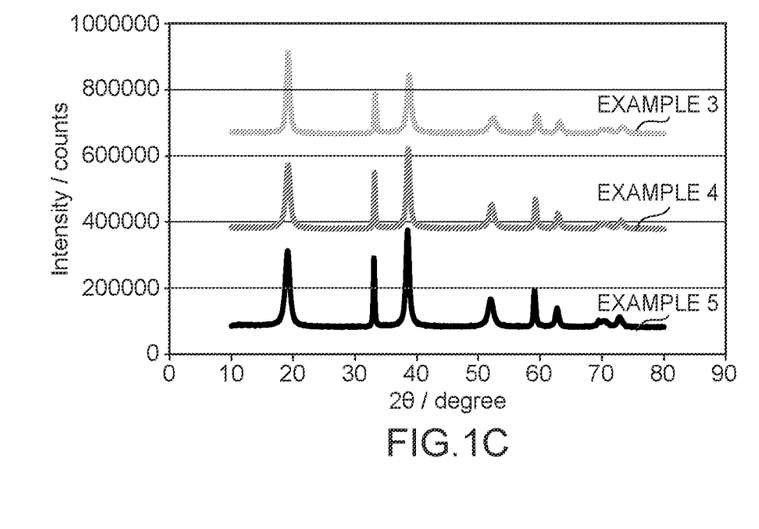
FIG. 1C illustrates powder X-ray diffraction patterns of the nickel composite hydroxides of Examples 3 to 5.
Figure 1D:
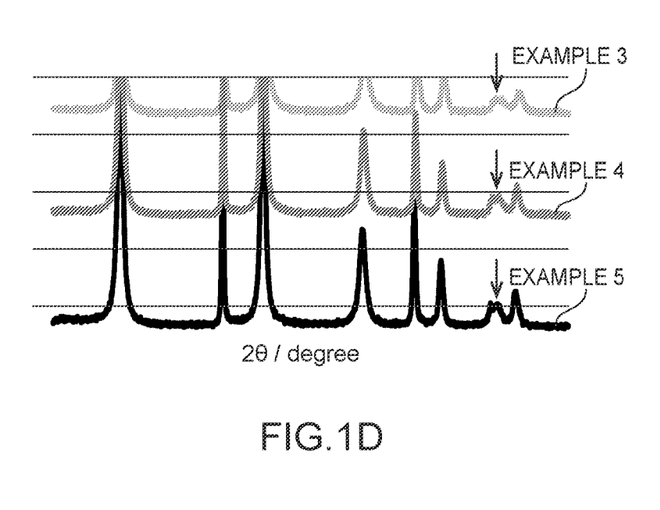
FIG. 1D illustrates enlarged views of the powder X-ray diffraction patterns shown in FIG. 1C.

The powder X-ray diffraction patterns of the nickel composite hydroxides of Examples 1 and 2 and Comparative Example 1 are shown in FIG. 1A, and the enlarged views thereof are shown in FIG. 1B, and the powder X-ray diffraction patterns of the nickel composite hydroxides of Examples 3 to 5 are shown in FIG. 1C, and the enlarged views thereof are shown in FIG. 1D. Moreover, the peak intensity ratios α/β are shown in Table 1 above. As shown in FIGS. 1A and 1B, the peak intensity β of the diffraction peak appearing in the range of 2θ=70.4±0.1° could not be detected, and therefore, the peak intensity ratio α/β was evaluated not to be calculated in Comparative Example 1.

Figure 2A:
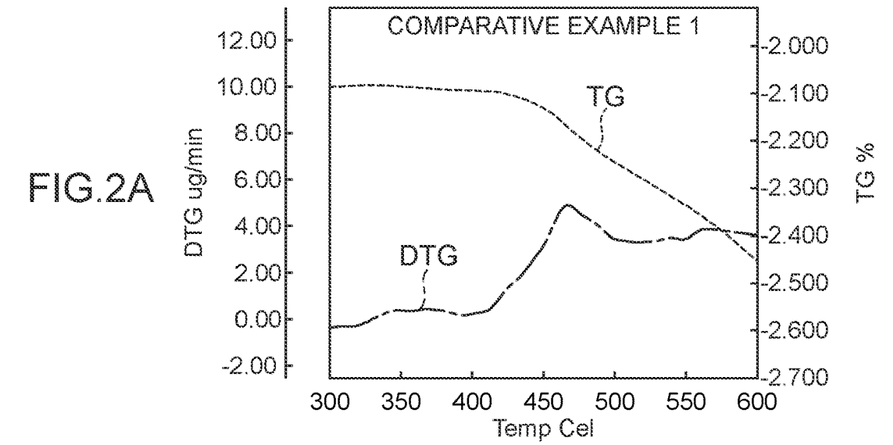
FIG. 2A is the TG measurement result of Comparative Example 1.
Figure 2B:
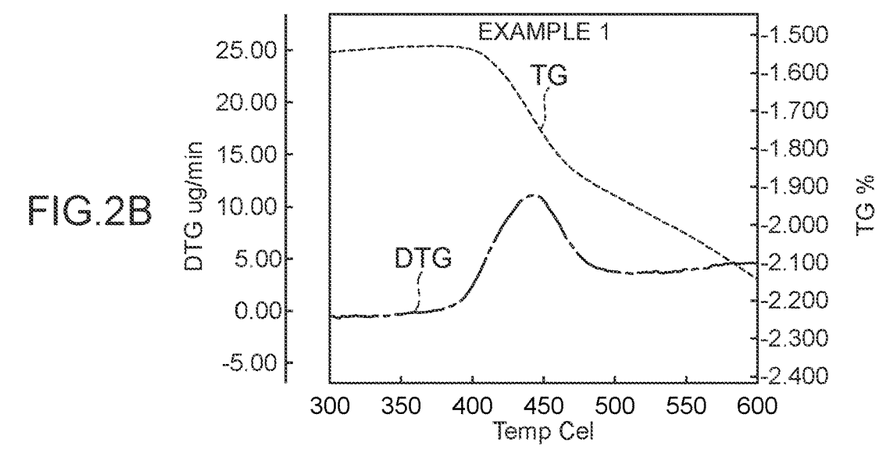
FIG. 2B is the TG measurement result of Example 1.
Figure 2C:
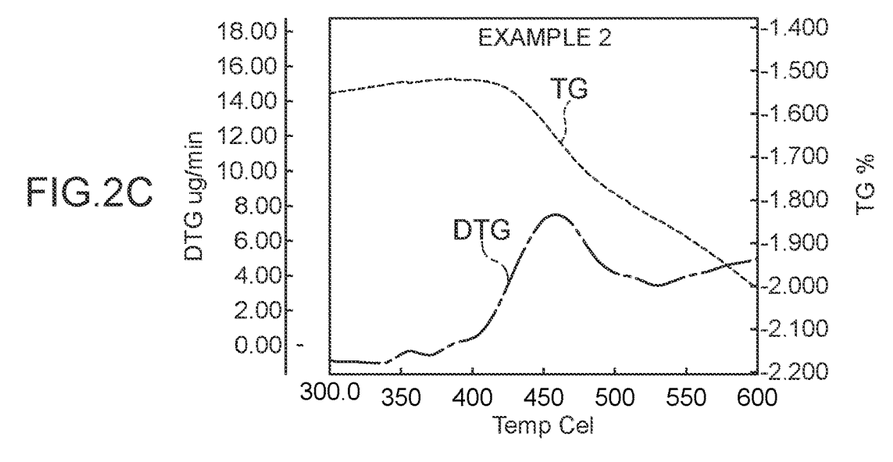
FIG. 2C is the TG measurement result of Example 2.

TG Measurement (Thermogravimetric Measurement) of Nickel Composite Hydroxides of Examples and Comparative Example Lithium hydroxide was mixed with each of the nickel composite hydroxides of Examples 1 to 5 and Comparative Example 1 so that a molar ratio of lithium/(nickel+cobalt+manganese) was 1.03 to prepare a mixture. The obtained mixture was subjected to TG measurement at a maximum temperature of 900° C., a rate of temperature rise of 10° C./min, a sampling frequency of 1 time/second, and in a dry air supply amount of 200 ml/min. A TG measuring apparatus that was "TG/DTA6300" manufactured by Hitachi, Ltd., was used. The TG measurement result of Comparative Example 1 is shown in FIG. 2A, the TG measurement result of Example 1 is shown in FIG. 2B, and the TG measurement result of Example 2 is shown in FIG. 2C. The peak positions (° C.) of DTG in the range of 300 to 600° C., obtained from the TG measurement results measured from 30 to 900° C., are shown in Table 2 below. Although not shown, the peak positions (° C.) of DTG were also measured in Examples 3 to 5 by carrying out TG measurement in the same manner as in Examples 1 and 2.

TABLE 2

| | Unit | Example 1 | Example 2 | Example 3 | Example 4 | Example 5 | Comparative Example 1 |
|---|---|---|---|---|---|---|---|
| Peak position of DTG | °C. | 441.3 | 445.3 | 439.5 | 458.0 | 457.8 | 462.1 |

Tables 1 and 2 showed that in Comparative Example 1 in which the peak intensity ratio α/β could not be calculated, the peak position of DTG was 462.1° C., whereas in Example 1 in which the peak intensity ratio α/β was 0.84, the peak position of DTG was reduced to 441.3° C., and in Example 2 in which the molar ratio of nickel:cobalt:manganese was different from that of Example 1 and the peak intensity ratio α/β was 0.90, the peak position of DTG was reduced to 445.3° C. From the above results, the nickel composite hydroxides of Examples 1 and 2 reacted with the lithium compounds at lower temperatures than the nickel composite hydroxide of Comparative Example 1. Therefore, it was found that the nickel composite hydroxides of Examples 1 and 2 could reduce the calcination temperatures when producing the positive electrode active materials as compared with the nickel composite hydroxide of Comparative Example 1.

Moreover, in Example 3 in which the molar ratio of nickel:cobalt:manganese was different from those of Examples 1 and 2, and the peak intensity ratio α/β was 0.83, the peak position of DTG was reduced to 439.5° C., in Example 4 in which the peak intensity ratio α/β was 0.90 when the pH of the mixed liquid in the reaction vessel was 10.2 based on the liquid temperature of 40° C. and the ammonia concentration was 0.0 g/L, the peak position of DTG was reduced to 458.0° C., and in Example 5 in which the molar ratio of nickel:cobalt:manganese was different from those of Examples 1, 3, and 4, and the peak intensity ratio α/β was 0.88 when the pH of the mixed liquid in the reaction vessel was 10.2 based on the liquid temperature of 40° C. and the ammonia concentration was 0.0 g/L, the peak position of DTG was reduced to 457.8° C. From the above results, the nickel composite hydroxides of Examples 3 to 5 reacted with the lithium compounds at lower temperatures than the nickel composite hydroxide of Comparative Example 1. Therefore, it was found that the nickel composite hydroxides of Examples 3 to 5 could reduce the calcination temperatures when producing the positive electrode active materials as compared with the nickel composite hydroxide of Comparative Example 1.

Since the nickel composite hydroxide of the present disclosure can reduce the calcination temperature when producing the positive electrode active material, the nickel composite hydroxide can be used in a wide range of fields such as mobile devices and vehicles.

What is claimed is:

1. A nickel composite hydroxide for a precursor of a positive electrode active material of a non-aqueous electrolyte secondary battery, wherein when in the nickel composite hydroxide, a peak intensity of a diffraction peak on a (200) plane in powder X-ray diffraction measurement using CuKα rays is defined as α, and a peak intensity of a diffraction peak on a (013) plane in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti and Zr,
   wherein a molar ratio of Ni:Co:Mn:M, of the nickel composite hydroxide is represented by 1−x−y−z:x:y:z, where $0<x\leq0.15$, $0<y\leq0.15$, $0\leq z\leq0.05$, and M represents one or more additive elements selected from the group consisting of Al, Fe, Ti and Zr.

2. The nickel composite hydroxide according to claim 1, wherein in the nickel composite hydroxide, the diffraction peak of the (200) plane is a diffraction peak appearing in a range of 2θ=69.2±0.1°, and the diffraction peak of the (013) plane is a diffraction peak appearing in a range of 2θ=70.4±0.1°, and when a peak intensity of the diffraction peak appearing in the range of 2θ=69.2±0.1° in powder X-ray diffraction measurement using CuKα rays is defined as α, and a peak intensity of the diffraction peak appearing in the range of 2θ=70.4±0.1° in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti, and Zr,
   wherein a molar ratio of Ni:Co:Mn:M, of the nickel composite hydroxide is represented by 1−x−y−z:x:y:z, where $0<x\leq0.15$, $0<y\leq0.15$, $0\leq z\leq0.05$, and M represents one or more additive elements selected from the group consisting of Al, Fe, Ti and Zr.

3. The nickel composite hydroxide according to claim 1, wherein in the nickel composite hydroxide, the diffraction peak of the (200) plane is a diffraction peak appearing in a range of 2θ=69.5±0.3°, and the diffraction peak of the (013) plane is a diffraction peak appearing in a range of 2θ=70.5±0.3°, and when a peak intensity of the diffraction peak appearing in the range of 2θ=69.5±0.3° in powder X-ray diffraction measurement using CuKα rays is defined as, and a peak intensity of the diffraction peak appearing in the range of 2θ=70.5±0.3° in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti, and Zr,
   wherein a molar ratio of Ni:Co:Mn:M, of the nickel composite hydroxide is represented by 1−x−y−z:x:y:z, where $0<x\leq0.15$, $0<y\leq0.15$, $0\leq z\leq0.05$, and M represents one or more additive elements selected from the group consisting of Al, Fe, Ti and Zr.

4. The nickel composite hydroxide according to claim 1, wherein a secondary particle diameter having a cumulative volume percentage of 50% by volume (D50) is 6.0 μm or more and 16.0 μm or less.

5. The nickel composite hydroxide according to claim 2, wherein a secondary particle diameter having a cumulative volume percentage of 50% by volume (D50) is 6.0 μm or more and 16.0 μm or less.

6. The nickel composite hydroxide according to claim 3, wherein a secondary particle diameter having a cumulative volume percentage of 50% by volume (D50) is 6.0 μm or more and 16.0 μm or less.

7. The nickel composite hydroxide according to claim 1, wherein a value of [a secondary particle diameter having a cumulative volume percentage of 90% by volume (D90)−a secondary particle diameter having a cumulative volume percentage of 10% by volume (D10)]/a secondary particle diameter having a cumulative volume percentage of 50% by volume (D50), is 0.80 or more and 1.2 or less.

8. The nickel composite hydroxide according to claim 2, wherein a value of [a secondary particle diameter having a cumulative volume percentage of 90% by volume (D90)−a secondary particle diameter having a cumulative volume percentage of 10% by volume (D10)]/a secondary particle diameter having a cumulative volume percentage of 50% by volume (D50), is 0.80 or more and 1.2 or less.

9. The nickel composite hydroxide according to claim 3, wherein a value of [a secondary particle diameter having a cumulative volume percentage of 90% by volume (D90)−a secondary particle diameter having a cumulative volume percentage of 10% by volume (D10)]/a secondary particle diameter having a cumulative volume percentage of 50% by volume (D50), is 0.80 or more and 1.2 or less.

10. A positive electrode active material of a non-aqueous electrolyte secondary battery, wherein the nickel composite hydroxide according to claim 1 is calcined with a lithium compound.

11. A positive electrode active material of a non-aqueous electrolyte secondary battery, wherein the nickel composite hydroxide according to claim 2 is calcined with a lithium compound.

12. A positive electrode active material of a non-aqueous electrolyte secondary battery, wherein the nickel composite hydroxide according to claim 3 is calcined with a lithium compound.

13. A method for producing a nickel composite hydroxide, comprising:
- a crystallization step of mixing an aqueous solution containing a nickel salt, a cobalt salt, and a manganese salt with a pH adjuster in a reaction vessel and performing coprecipitation reaction in the mixed liquid to obtain a crude nickel composite hydroxide; and
- a solid-liquid separation step of washing the crude nickel composite hydroxide obtained in the crystallization step with an alkaline aqueous solution and then subjecting the resultant to solid-liquid separation,
- wherein an ammonia concentration of the mixed liquid in the crystallization step is 0.0 g/L or more and 3.5 g/L or less, and a pH of the mixed liquid based on a liquid temperature of 40° C. is 10.4 or more and 11.5 or less, and
- wherein in the nickel composite hydroxide, a peak intensity of a diffraction peak on a (200) plane in powder X-ray diffraction measurement using CuKα rays is defined as α, and a peak intensity of a diffraction peak on a (013) plane in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti and Zr, and
- wherein a molar ratio of Ni:Co:Mn:M, of the nickel composite hydroxide is represented by 1−x−y−z:x:y:z, where 0<x≤0.15, 0<y≤0.15, 0≤z≤0.05, and M represents one or more additive elements selected from the group consisting of Al, Fe, Ti and Zr.

14. The method for producing a nickel composite hydroxide according to claim 13, wherein the aqueous solution containing a nickel salt, a cobalt salt, and a manganese salt is mixed with an ammonium ion donor and the pH adjuster in the reaction vessel.

15. A method for producing a positive electrode active material of a non-aqueous electrolyte secondary battery, comprising:
- a crystallization step of mixing an aqueous solution containing a nickel salt, a cobalt salt, and a manganese salt with a pH adjuster in a reaction vessel and performing coprecipitation reaction in the mixed liquid to obtain a crude nickel composite hydroxide; and
- a solid-liquid separation step of washing the crude nickel composite hydroxide obtained in the crystallization step with an alkaline aqueous solution and then subjecting the resultant to solid-liquid separation, the method comprising:
- a step of controlling an ammonia concentration of the mixed liquid in the crystallization step to 0.0 g/L or more and 3.5 g/L or less and controlling a pH of the mixed liquid based on a liquid temperature of 40° C. to 10.4 or more and 11.5 or less to obtain a nickel composite hydroxide;
- a step of adding a lithium compound to the obtained nickel composite hydroxide to obtain a mixture of the lithium compound and the nickel composite hydroxide; and
- a step of calcining the mixture at a calcination temperature of 500° C. or higher and 650° C. or lower,
- wherein in the nickel composite hydroxide, a peak intensity of a diffraction peak on a (200) plane in powder X-ray diffraction measurement using CuKα rays is defined as α, and a peak intensity of a diffraction peak on a (013) plane in powder X-ray diffraction measurement using CuKα rays is defined as β, a value of α/β is 0.75 or more and 0.95 or less, and the nickel composite hydroxide comprises Ni, Co, Mn, and one or more additive elements M selected from the group consisting of Al, Fe, Ti and Zr, and
- wherein a molar ratio of Ni:Co:Mn:M, of the nickel composite hydroxide is represented by 1−x−y−z:x:y:z, where 0<x≤0.15, 0<y≤0.15, 0≤z≤0.05, and M represents one or more additive elements selected from the group consisting of Al, Fe, Ti and Zr.

16. The method for producing a positive electrode active material of a non-aqueous electrolyte secondary battery according to claim 15, wherein the aqueous solution containing a nickel salt, a cobalt salt, and a manganese salt is mixed with an ammonium ion donor and the pH adjuster in the reaction vessel.

* * * * *